Dec. 8, 1964  E. BRUNNER  3,160,689
METHOD OF FORMING SHAPED CELLULAR BODIES
Filed May 24, 1961

```
STARTING MATERIAL: PLASTIGEL OF POLYVINYLCHLORIDE OR THE LIKE PLUS
SOFTENER AND BLOWING AGENT.
                            │
                            ▼
FORMING OF PLASTIGEL A SHAPED BODY CORRESPONDING TO DESIRED FINAL
CONFIGURATION ON A REDUCED SCALE.
                            │
                            ▼
INTRODUCING SHAPED BODY INTO PRESSURE VESSEL HAVING INTERIOR
DIMENSIONS GREATER THAN DESIRED FINAL CONFIGURATION
AND SIZE OF SHAPED BODY.
                            │
                            ▼
SUBJECTING SHAPED BODY IN PRESSURE VESSEL TO GASEOUS
PRESSURE OF FOR INSTANCE BETWEEN 20 AND 120 ATMOSPHERES.
                            │
                            ▼
HEATING SHAPED BODY WHILE UNDER PRESSURE IN PRESSURE VESSEL
TO TEMPERATURE SUFFICIENTLY HIGH TO GELATINIZE PLASTIGEL
AND DECOMPOSE BLOWING AGENT UNDER GAS FORMATION, FOR
INSTANCE TEMPERATURE OF BETWEEN 160 AND 180°C WHEREBY DUE
TO PRESSURE DECOMPOSITION GAS OF BLOWING AGENT WILL BE
DISSOLVED IN SHAPED BODY SUBSTANTIALLY WITHOUT INCREASE
IN DIMENSIONS OF THE LATTER.
                            │
                            ▼
COOLING SHAPED BODY WHILE UNDER PRESSURE IN PRESSURE
VESSEL TO BELOW GELATINIZATION TEMPERATURE BUT MAINTAINING
TEMPERATURE SUFFICIENTLY HIGH TO RETAIN PLASTIC CONDITION
OF SHAPED BODY, FOR INSTANCE BETWEEN 80 AND 120°C.
                            │
                            ▼
RELEASING OVER-PRESSURE IN PRESSURE VESSEL CAUSING EXPANSION
OF SHAPED BODY THEREIN TO DESIRED FINAL CONFIGURATION AND
SIZE AS A CELLULAR BODY WHICH DOES NOT COMPLETELY FILL
PRESSURE VESSEL AND WITHOUT CAUSING CONTACT BETWEEN PRESSURE
VESSEL AND SHAPED BODY DURING EXPANSION OF THE LATTER
DUE TO THE GREATER INTERIOR DIMENSIONS OF THE PRESSURE
VESSEL.
                            │
                            ▼
REMOVAL OF EXPANDED CELLULAR BODY FROM PRESSURE VESSEL,
THE EXPANDED CELLULAR BODY HAVING A CONFIGURATION
CORRESPONDING TO THAT OF SHAPED PLASTIGEL BODY BUT AT THE
DESIRED INCREASED SIZE
```

INVENTOR
Emil Brunner
BY Michael S. Striker
ATTORNEY 3,160,689
METHOD OF FORMING SHAPED CELLULAR BODIES
Emil Brunner, Sins, Aargau, Switzerland, assignor to Lonza Electric and Chemical Works Ltd., Basel, Switzerland
Filed May 24, 1961, Ser. No. 112,228
Claims priority, application Switzerland, May 24, 1960, 6,037/60
7 Claims. (Cl. 264—54)

The present invention relates to a method of forming shaped cellular bodies, and more particularly, the present invention is concerned with a method for producing cellular bodies of predetermined configuration and consisting to a very large extent or totally of a closed cell structure. The cells in the cellular material are formed by the expansion of gas in the plastic mass, which gas may be generated by decomposition of suitable blowing agents which are incorporated in the plastic mass.

Closed cell cellular bodies were formed by introducing a blowing agent-containing suitable synthetic material into a pressure vessel and decomposing the blowing agent so that the mass in the vessel will expand and eventually completely fill the same. However, the shapes which can be produced in this manner are limited to the shapes of pressure vessels which can be made available for this purpose, since the finished product will correspond to the configuration of the pressure vessel. It has also been proposed to remove the material from the pressure vessel before expansion has been completed and to allow further expansion to take place without confining the cellular material. In this manner, obviously, it is not possible to obtain a cellular body of predetermined configuration.

It is an object of the present invention to provide a method which will permit in a simple and economical manner the production of cellular, primarily closed-cell, bodies which will have any desired configuration.

It is another object of the present invention to produce closed-cell cellular bodies of predetermined configuration without requiring high pressure molds or any molds which correspond to the configuration and size of the finished product.

Other objects and advantages of the present invention will become apparent from a further reading of the description and of the appended claims.

With the above and other objects in view, the present invention contemplates a method of producing a cellular body of predetermined configuration, comprising the steps of shaping a mass of plastigel containing a blowing agent substantially evenly distributed therein, so as to form thereof a shaped body having a configuration corresponding to the predetermined configuration but on a reduced scale, gelatinizing the plastigel, simultaneously decomposing the blowing agent therein, while maintaining it at the gelatinizing temperature and under a gaseous superatmospheric pressure sufficiently high to prevent expansion of the shaped body, cooling the gelatinized shaped body below the gelatinizing temperature thereof while maintaining the superatmospheric pressure, and thereafter reducing the superatmospheric pressure so as to allow the gas formed upon decomposition to the blowing agent to expand, thereby transforming the gelatinized shaped body into a cellular body while simultaneously increasing the dimensions of the body to the predetermined configuration.

The process of the present invention is illustrated by the flow sheet of the drawing.

According to the present invention the same consists in the production of a closed-cell cellular body of predetermined configuration, by shaping a mass of plastigel consisting essentially of a mixture of a first substance selected from the group consisting of polyvinylchloride and mixed polymerizates of vinylchloride and a second substance selected from the group consisting of solvents and softeners therefor, and containing a blowing agent substantially evenly distributed therein, so as to form thereof a shaped body having a configuration corresponding to the predetermined configuration but on a reduced scale, placing the thus-formed shaped body into a pressure vessel having interior dimensions exceeding those of the cellular body of predetermined configuration, subjecting the shaped body in the pressure vessel to superatmospheric gaseous pressure and to an elevated temperature of between about 160 and 180° C. and sufficiently high to decompose the blowing agent and to gelatinize the plastigel while due to the superatmospheric pressure expansion of the shaped body is substantially prevented and the gas formed by decomposition of the blowing agent will be substantially distributed throughout the thus-gelatinized body, cooling the gelatinized shaped body to a temperature of between 80 and 120° C. being below the gelatinization temperature thereof while maintaining the superatmospheric pressure, the shaped body being in plastic condition, and thereafter reducing the superatmospheric pressure so as to allow the gas formed upon decomposition of the blowing agent to expand without completely filling the pressure vessel, thereby transforming the gelatinized shaped body into a closed-cell cellular body while simultaneously increasing the dimensions of the body to the predetermined configuration.

Thus, according to the present invention, shaped bodies of a great variety of configurations consisting of a closed cell cellular structure can be produced, for instance profiled elongated elements, blocks, containers, etc., and such bodies can be produced without requiring expensive high pressure molds corresponding to the desired final configuration of the finished product. It is another advantage of the present invention that the pressure vessel in which it lets the initial expansion of the material take place need not be completely cooled to ambient temperature between successive production runs. Thus, the number of units which can be produced in a single installation is greatly increased.

It may be noted that according to some of the prior art methods, the finished product is a relatively large block of cellular material which must then be shaped by cutting, sawing or the like so that unavoidably certain percentage of waste material will accrue. In contrast thereto, according to the present invention it is possible to fully utilize the starting materials. A new important improvement of the present invention consists to employ the starting material in form of plastigels, which have a putty-like consistency and are cold deformable and can be shaped.

This plastigel material will be shaped so as to correspond to the desired final configuration however on a reduced scale. This shaping is carried out without decomposition of the blowing agent.

The thus formed shaped body is then introduced into a pressure vessel which may be of any desired, conventional configuration provided that its interior dimensions are sufficiently large to accommodate the shaped body even after at least partial expansion of the same, without causing contact between the expanding shaped body and the walls of the pressure vessel. Such contact—apart from supporting the shaped body in the pressure vessel—must be avoided in order to prevent any impediment to the uniform expansion of the shaped body. After introducing the shaped body into the pressure vessel, gas under pressure is introduced into the latter so that the shaped body will now be subjected to superatmospheric gaseous pressure, for instance between 20 and 120 atmospheres. The shaped body in the pressure vessel is then heated while under such superatmospheric pressure to a temperature which is sufficiently high to cause gelatinization and homogenization of the plastigel and to cause decomposition of the blowing agent. The superatmospheric gaseous pressure in the pressure vessel must be sufficiently high to prevent expansion of the shaped body by the gases formed upon decomposition of the pressure vessel. Due to such superatmospheric pressure, the gases which are generated in the interior of the shaped body will be dissolved and thus evenly distributed in the same. The shaped body which is at its gelatinization temperature and in which the gases formed upon decomposition of the blowing agent are dissolved, is then cooled below its gelatinization temperature so as to be in plastic condition. During such cooling, the superatmospheric pressure is maintained so that the shaped body when cooled to such plastic condition will still have its original dimensions. Thereafter, the superatmospheric pressure is slowly reduced to atmospheric pressure during such reduction of the superatmospheric pressure acting on the shaped body, the gases which are evenly distributed in the shaped body will expand and thereby transform the shaped body into a cellular body of primarily closed cell structure having the desired final shape and configuration. It is essential that upon completion of the expansion in the pressure vessel, the expanded cellular body still does not completely fill the pressure vessel and, in fact, does not touch the inner walls thereof except where possibly contact between a portion of the cellular body and the pressure vessel structure is required for support of the cellular body. The thus expanded and still warm cellular bodies are then removed from the pressure vessel.

According to one embodiment of the present invention, a limited expansion of the gas distributed in the shaped body is carried out prior to cooling the same from its gelatinization temperature to a temperature in which the material will still be in plastic condition. This is accomplished by somewhat reducing the superatmospheric pressure after gelatinization and decomposition of the blowing agent has been accomplished and prior to lowering the temperature of the material.

It is possible to expand the shaped body to its final predetermined configuration while the body is located in the pressure vessel. However, particularly with respect to thick walled shaped bodies, it is also possible to remove the body from the pressure vessel after partial expansion and reduction of the pressure to atmospheric pressure and thereafter to place the shaped body into a warming cabinet wherein further expansion of the body takes place at atmospheric pressure and at a somewhat elevated temperature which will maintain the plastic condition of the material. Depending on the geometrical configuration of the shaped body the expansion can cause an enlargement at an identical or different rate in the three directions of the body.

In any event, irrespective of whether complete expansion or only partial expansion is carried out in the pressure vessel, it is not necessary to cool the pressure vessel below the temperature at which expansion of the shaped body is to take place. This temperature will be below the gelatinizing temperature of the material but sufficiently high to maintain the material in a plastic condition which will permit the gas to expand and thus to blow up the shaped body into a cellular body upon reduction of the superatmospheric gaseous pressure to which the shaped body has been previously exposed in the pressure vessel. Thus, according to the present invention, after placing a shaped body into the pressure vessel, the same is to be heated under superatmospheric pressure to the gelatinization temperature of the material, usually to a temperature of between 160 and 180° C. which will be sufficiently high to decompose the blowing agent, and thereafter the pressure vessel and its contents will have to be cooled only down to a temperature of between 80 and 120° C., the superatmospheric pressure will be reduced, the expanded or partially expanded body removed from the pressure vessel and the latter is now ready to receive the next charge consisting of a shaped body or bodies. Thus, the time which otherwise would be required for cooling from a temperature of about 80 to 120° C. down to ambient temperature and the time required for the subsequent heating from ambient temperature to about 80–120° C. will be saved and consequently the operating capacity of the pressure vessel and the economy of the operation will be greatly improved.

It is essential according to the present invention that the starting material, for instance, the polyvinylchloride, will be in the special form of a plastigel, corresponding to a putty-like mass, which is in a plastic and cold deformable condition. Such material, preferably a polymerizate or mixed polymerizate of vinylchloride which contains softeners and/or solvents and throughout which a blowing agent has been distributed, will be transformed into a putty-like consistency, preferably by the addition of stiffening gelling agents.

The thus formed mass is adapted to be deformed under ambient pressure and temperature conditions and to retain its shape upon subsequent heating to its gelatinization or melting temperature.

Compositions of synthetic material which possess the above described qualities are well known in the art, are identified by the term "plastigel" and are for instance described in "Kunststoff" 48 (1958), pages 436 ff.

According to the present invention, a blowing agent is incorporated in the plastigel and the same is then shaped, so to say, as a reduced scale model of the final article and allowed to expand in the manner described above so as to form a cellular body of desired configuration.

A preferred manner of preparing the plastigel which forms the starting material for the process of the present invention consists in incorporating in a plastisol which would lose its shape upon heating and which may consist of a mixture of polyvinylchloride and softeners, a stiffening gelling agent, such as aluminum laurate, aluminum stearate, magnesium stearate, calcium carbonate, calcium silicate, colloidal silicic acid, copper-phthalocyanine, or commercially available products such as bentonites or aerosil. These additives endow the plastigel with the special quality required according to the present invention, namely that a mass consisting thereof may be deformed under the conditions of ambient pressure and temperature or at somewhat elevated temperature, which, however, must be below the decomposition temperature of the blowing agent, and that a thus formed shaped body upon being further heated to gelatinization temperature, will retain its shape.

It is also possible to produce such plastigel by mixing and kneading of softeners together with special types of polyvinylchloride, or copolymerisates, which are produced by special polymerization methods and which are capable of forming putty-like masses when mixed with such softeners.

According to the present invention, decomposition of the blowing agent is carried out in the pressure vessel simultaneous with the heating of the shaped body to its gelatinization temperature, whereby a gaseous pressure is maintained which will prevent expansion of the thus heated shaped body. After gelatinization of the shaped body has been completed, it is also possible to allow for limited expansions of the shaped body while the same is maintained at gelatinization temperature. This is accomplished by somewhat reducing the superatmospheric gaseous pressure in the pressure vessel. Further expansion to a larger degree, either complete expansion or partial expansion will then be carried out in the pressure vessel after the body has been cooled to below its gelatinization temperature and, of course, in such a manner that the pressure vessel will not be completely filled with the expanded body so that the shape of the same will not be affected by coming in contact with the wall of the pressure vessel. Thus, it is possible according to the present invention to produce a great variety of shapes in one and the same pressure vessel, the only condition being that the pressure vessel is sufficiently large to allow for the desired degree of expansion of the shaped body without causing additional contact between the shaped body and the inner wall of the pressure vessel.

The final expansion may also be carried out after removal of the partially expanded body and while the same is placed into a heating cabinet or chamber, or is maintained in other suitable manner at a temperature at which the material of the body will be of sufficient plasticity to allow for expansion under the influence of the pressure of the gas distributed in the body.

The individual steps of the process of the present invention may be described as follows:

(a) The starting material, i.e., the plastigel is produced in conventional manner, for instance as described in the "Kunststoff" article referred to above, however, in addition thereto a suitable quantity of blowing agent is intimately mixed with the plastigel. Furthermore, additives which are known per se can be incorporated, such as filler materials, coloring materials, pigments and the like.

(b) The blowing agent-containing plastigel is now shaped, for instance molded or extruded into a shape corresponding essentially to the shape of the finished product, however at a reduced scale. This shaping of the blowing agent-containing plastigel may be carried out at ambient temperature or at somewhat elevated temperature. However, care must be taken that the temperature at which this preliminary shaping is carried out will be too low to cause decomposition of the blowing agent.

(c) The thus shaped body or bodies are now introduced into a pressure vessel having interior dimensions which do not depend on the shape of the article which is to be formed but which must be sufficiently large to permit the desired degree of expansion of the shaped body. Thus, the initial shaped bodies will preferably occupy only a relatively small portion of the interior of the pressure vessel so that the shaped body may expand therein without being pressed against the walls of the pressure vessel. Thereafter, the pressure vessel is closed and gas under pressure, for instance under a pressure of between 30 and 100 atmospheres is introduced into the pressure vessel so that the shaped body is exposed to such superatmospheric pressure.

(d) The interior of the pressure vessel with the shaped body therein is now heated to gelatinization temperature, for instance to a temperature of between 160 and 180° C., whereby the blowing agent will be decomposed and the plastigel will be gelatinized while, however, the shape and dimensions of the shaped body will not change since the same is prevented from expanding by the superatmospheric gaseous pressure to which it is exposed. Thus, the gases which are formed by decomposition of the blowing agent will be dissolved and evenly distributed in the shaped body.

(e) Preferably, however not absolutely required, a pre-expansion step is carried out after completion of the gelatinization. This pre-expansion is carried out by reducing the gaseous pressure in the pressure vessel while maintaining a gelatinization temperature. Reduction of gaseous pressure is carried out to such an extent that the volume of the body will increase by between about 20 and 40%. The thus somewhat enlarged body still will only occupy a relatively small portion of the pressure vessel.

(f) The temperature in the pressure vessel is now reduced under maintenance of the superatmospheric pressure, until the material of the shaped body is cooled to a temperature below its gelatinization temperature but still sufficiently high to maintain a plastic condition of the material. Such temperature generally, particularly in the case of polyvinylchloride and mixed polymerizates of the vinylchloride as basis of the plastigel, will be between about 80 and 120° C., most preferably between about 80 and 90° C. After cooling of the body in the pressure vessel to such lower temperature, the gaseous superatmospheric pressure is released so that the body under the influence of the gas formed by decomposition of the blowing agent and distributed throughout the body, will slowly and completely expand and will reach its final dimensions which will correspond to the shape of the initially formed shaped body but on a larger scale. Here again, it is essential that the thus expanded cellular body will not press against the walls of the pressure vessel, in other words, will not completely fill the pressure vessel. Preferably, the expanded body will fill the pressure vessel at most to about 50%.

The thus completed shaped cellular body may now be removed from the pressure vessel while still at a temperature of between 80 and 120° C., or after further cooling down to a temperature of about 60° C. Such further cooling will increase the rigidity of the cellular body, however, it will not be necessary under the conditions described herein to cool below 60° C. On the other hand, it is desirable to keep the lowest temperature in the pressure vessel as high as possible in order to reduce the time and expense involved in subsequently heating the recharged pressure vessel to the gelatinization temperature of for instance between 160 and 180° C.

It is also possible, to remove the only partially expanded body, having for instance a volume of about between 200–400% of the volume of the original body, from the pressure vessel and to complete expansion of the body, for instance to a volume of about between 600–900% of the volume of the original body, outside of the pressure vessel for instance in a heating cabinet maintained at 80° C.

In this manner, a cellular body of desired configuration and primarily consisting of closed cells of even shape and size is obtained, which finished body represents an enlargement of the original shaped body. By proportioning the amounts of blowing agent and softener in the plastigel of which the original small scale shaped body is formed, it is possible to produce finished bodies of the desired predetermined configuration having a specific weight of for instance between 0.05 and 0.5 g./cm.$^3$, and of varying hardness or softness.

It follows that the initially formed shaped body of plastigel corresponds to the desired final shape but on a reduced scale. Such shaped bodies may be elongated bodies of various profiles such as edged or round rods, T-pieces, small containers, pipes and the like. Due to the completion of the individual cellular bodies in one single process without requiring any cutting or subsequent shaping, the finished cellular bodies will be formed with an outer tear-resistant skin which will improve the mechanical strength and impact resistance of the finished article.

Preferably, the starting material will be based on polyvinylchloride or on mixed polymerizates of vinylchloride of which generally the plastigel will be produced by adding to the conventional mixtures of polyvinylchloride and softener one or the other of the stiffening or gelling agents such as aluminum laurate, etc. Good results were also obtained by using as basis of the plastigel mixed polymerisates of vinylchloride which for instance may be formed of 90% vinylchloride and 10% vinylacetate, or 50% vinylchloride and 50% vinylidenechloride. In certain cases, special types of polyvinylchloride are used which are produced by special polymerization methods and of which plastigels can be produced by kneading of the polyvinylchloride with softeners.

Suitable softeners include the softeners which are well known for use in connection with polyvinylchloride and mixed polymerizates of vinylchloride and which have a relatively high boiling point, such as dioctylphthalate, tricresylphosphate, alkali sebasate or esters of polyvalent alcohols.

Suitable blowing agents include azoisobutyric-acid dinitrile, benzenesulfohydrazine or diazoaminobenzene.

The temperatures at which gelatinization of the plastigel is carried out as well as the temperature at which at least the major portion of the expansion of the shaped body is to take place will depend on the type and composition of the plastigel and generally will be within about 160 and 180° C. for the gelatinization and between about 80 and 120° C. for the expansion of the shaped body while the same is in plastic condition.

The following examples are given by way of illustration only without limiting the invention to the specific details thereof.

*Example 1*

A mixture consisting of 20.0 kg. of a polyvinylchloride emulsion polymerizate, 0.3 kg. lead carbonate, 0.5 kg. blowing agent, for instance, azoisobutyric acid dinitrile and 10.0 kg. dioctylphthalate was worked up by means of rollers into a homogeneous plastigel. The plastigel was then shaped into a body having a length of 50 mm., a breadth of 50 mm., and a thickness of 5 mm. This body which represented a model on a reduced scale of the desired final product, was then introduced into a pressure vessel having interior dimensions of 100 x 100 x 50 mm. Thereafter, the pressure vessel was closed and compressed gas was introduced so as to create a pressure of 20 atmospheres in the pressure vessel. Thereafter, the pressure vessel and the body therein were heated to 180° C. After maintaining a temperature of 180° C. for 15 minutes the material of the body was completely gelatinized without any change in the shape of the body. The gaseous pressure was now reduced to 15 kg./cm.$^2$ in order to achieve a limited expansion of the body. The temperature in the pressure vessel, i.e., of the slightly expanded body was then lowered to 120° C. and after 5 minutes, the superatmospheric pressure was released. This resulted in further expansion of the body which now retained for 15 minutes at atmospheric pressure and at a temperature of 120° C. Thereafter, the now completely expanded and still warm body was removed from the pressure vessel and it was found that the thus formed cellular body had a length of 90 mm., a breadth of 90 mm. and a thickness of 9 mm. The specific weight of the thus formed cellular body was 0.17 g./cm.$^3$.

*Example 2*

A plastigel was formed of a mixture consisting of 20.0 kg. of a polyvinylchloride, obtained by polymerization in an emulsion, 0.3 kg. lead carbonate, 0.5 kg. of a clay-type filler, 1.0 kg. of a blowing agent and 18.0 kg. of dioctylphthalate.

The plastigel was then extruded on a single screw extrusion press at a temperature of between 60 and 80° C. so as to form a rod having a cross section of 5 x 20 mm. Individual pieces of the thus formed rod having a length of 3 meters were introduced into a jacketed pressure tube having a length of 7 meters and an inner diameter of 50 mm. After introduction of the rod, compressed gas was introduced so as to create in the pressure tube a pressure of 30 atmospheres. The interior of the pressure tube was then heated to 180° C. After 15 minutes the plastigel is completely gelatinized and the gaseous pressure was then reduced to 10 atmospheres so as to allow for pre-expansion of the rod and thereafter, the temperature was reduced to 120° C. After maintaining the temperature at 120° C. for about 5 minutes, the superatmospheric pressure was released and the rod was allowed to remain in the pressure tube at ambient pressure and a temperature of 120° C. for a further period of 15 minutes. The thus completed expanded rod was then removed while still warm and it was found that its cross sectional dimensions were 10 x 40 mm. and its length 5000 mm. The specific gravity of the expanded cellular rod was about 0.15 g./cm.$^3$.

*Example 3*

A plastigel in sheet form was produced between rollers at a temperature of 90° C. from a mixture consisting of 70 kg. of a mixed polymerizate of 90% vinylchloride and 10% vinylacetate, 4 kg. calcium silicate, 5 kg. blowing agent and 30 kg. trikresylphosphate. The thus formed sheet was then shaped into square containers having the dimensions 100 x 50 x 50 mm. and a wall thickness of 7 mm. The thus formed shaped body which corresponds to a model on a reduced scale of the desired final article, was then introduced into a pressure vessel having interior dimensions of 200 x 100 x 80 mm. In the pressure vessel pressure of 30 atmospheres was then created by introduction of compressed gas, and the interior of the pressure vessel with the shaped body therein was heated to about 170° C. After 10 minutes, the plastigel container was completely gelatinized without having changed its shape. The gaseous pressure was then reduced to about 25 kg./cm.$^2$ while the temperature was still maintained at 170° C. Thereby, a limited pre-expansion was accomplished. Thereafter, the temperature was reduced to about 110° C. and after allowing the pre-expanded body to stand at that temperature and at a pressure of about 25 kg./cm.$^2$ for about 5 minutes, the superatmospheric pressure was released and the body was allowed to stand for additional 20 minutes while being maintained at a temperature of about 110° C. The thus obtained, still warm and completely expanded structure was then removed from the pressure vessel and it was found that the specific gravity thereof was about 0.25 g./cm.$^3$. The expanded container has a volume about 7 times greater than the original container.

*Example 4*

A plastigel was produced of a mixture of 80 kg. of a mixed polymerizate of 50% vinylchloride and 50% vinylidene chloride, 3 kg. lead carbonate, 5 kg. colloidal silicic acid, 8 kg. blowing agent and 20 kg. of the butylester of the sebacic acid.

The plastigel was then extruded at a temperature of 75° C. into a rod of square cross section of 7 x 7 mm. Individual rods having a length of 2 meters were then introduced into a jacketed pressure vessel having a length of 5 meters and a diameter of 50 mm. Compressed gas was introduced into the pressure vessel so as to create therein a superatmospheric pressure of 25 kg./cm.$^2$. Thereafter, the interior of the pressure vessel and the rod therein were heated to 175° C. After maintaining the above pressure and temperature for 15 minutes, the gaseous pressure was reduced to 20 kg./cm.$^2$ and thereafter, the temperature was reduced to 115° C. After maintaining a temperature of 115° C. and a pressure of 20 kg./cm.$^2$ for 10 minutes, the pressure was further reduced to atmospheric pressure while the temperature was maintained for an additional 10 minutes at 115° C. The still warm and now completely expanded rod was now removed from the pressure vessel and it was found that the dimensions of the rod were 14 x 14 x 3300 mm. and the specific gravity 0.20 g./cm.$^3$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a closed cell cellular body of predetermined configuration and size, comprising the steps of shaping a mass of plastigel consisting essentially of a mixture of a substance selected from the group consisting of polyvinylchloride and mixed polymerizates of vinylchloride with vinylacetate and vinylidenechloride and a softener therefor capable of maintaining the plastigel in a cold deformable condition, and containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having larger interior dimensions exceeding those of said cellular body of predetermined configuration and size; subjecting said shaped body in said pressure vessel to superatmospheric gaseous pressure and to an elevated temperature sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; cooling said gelatinized shaped body to a lower elevated temperature being below the gelatinization temperature of said shaped body but sufficiently high to maintain said shaped body in plastic condition, while maintaining said superatmospheric pressure; and thereafter reducing said superatmospheric pressure to atmospheric pressure in said pressure vessel so as to allow the gas formed upon decomposition of said blowing agent to expand so as to expand said shaped body to said predetermined configuration and size, whereby the thus-expanded cellular body will not press against the walls of said pressure vessel due to the larger interior dimensions thereof, and said gelatinized shaped body will be transformed into a closed cell cellular body of said predetermined configuration.

2. A method of producing a closed cell cellular body of predetermined configuration and size, comprising the steps of shaping a mass of plastigel consisting essentially of a mixture of a substance selected from the group consisting of polyvinylchloride and mixed polymerizates of vinylchloride with vinylacetate and vinylidenechloride and a softener therefor capable of maintaining the plastigel in a cold deformable condition, and containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having larger interior dimensions exceeding those of said cellular body of predetermined configuration and size; subjecting said shaped body in said pressure vessel to superatmospheric gaseous pressure and to an elevated temperature of between about 160 and 180° C. and sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; cooling said gelatinized shaped body to a temperature of between 80 and 120° C. being below the gelatinization temperature of said shaped body but sufficiently high to maintain said shaped body in plastic condition, while maintaining said superatmospheric pressure; and thereafter reducing said superatmospheric pressure to atmospheric pressure in said pressure vessel so as to allow the gas formed upon decomposition of said blowing agent to expand so as to expand said shaped body to said predetermined configuration and size, whereby the thus-expanded cellular body will not press against the walls of said pressure vessel due to the larger interior dimensions thereof, and said gelatinized shaped body will be transformed into a closed cell cellular body of said predetermined configuration.

3. A method of producing a closed cell cellular body of predetermined configuration and size, comprising the steps of shaping a mass of plastigel consisting essentially of a mixture of a substance selected from the group consisting of polyvinylchloride capable of maintaining the plastigel in a cold deformable condition and mixed polymerizates of vinylchloride with vinylacetate and vinylidenechloride and a softener therefor, and containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having larger interior dimensions exceeding those of said cellular body of predetermined configuration and size; subjecting said shaped body in said pressure vessel to superatmospheric gaseous pressure and to an elevated temperature sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; carrying out a pre-expansion at the gelatinization temperature to such an extent, that the volume of the body will increase between 20–40%; cooling said gelatinized shaped body to a lower elevated temperature being below the gelatinization temperature of said shaped body but sufficiently high to maintain said shaped body in plastic condition, while maintaining said superatmospheric pressure; and thereafter reducing said superatmospheric pressure to atmospheric pressure in said pressure vessel so as to allow the gas formed upon decomposition of said blowing agent to expand so as to expand said shaped body to said predetermined configuration and size, whereby the thus-expanded cellular body will not press against the walls of said pressure vessel due to the larger interior dimensions thereof and said gelatinized shaped body will be transformed into a closed cell cellular body of said predetermined configuration.

4. A method of producing a closed cell cellular body of predetermined configuration and size, comprising the steps of shaping a mass of plastigel consisting essentially of a mixture of a substance selected from the group consisting of polyvinylchloride and mixed polymerizates of vinylchloride with vinylaceate and vinylidenechloride, a softener therefor capable of maintaining the plastigel in a cold deformable condition and a stiffening gelling agent, selected from the group consisting of aluminum laurate, aluminum stearate, magnesium stearate, calcium carbonate, calcium silicate, colloidal silicic acid, copper-phthalocyanine, bentonites and aerosil, and containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having larger interior dimensions exceeding those of said cellular body of predetermined configuration and size;

subjecting said shaped body in said pressure vessel to superatmospheric gaseous pressure and to an elevated temperature sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; cooling said gelatinized shaped body to a lower elevated temperature being below the gelatinization temperature of said shaped body but sufficiently high to maintain said shaped body in plastic condition, while maintaining said superatmospheric pressure; and thereafter reducing said superatmospheric pressure to atmospheric pressure in said pressure vessel so as to allow the gas formed upon decomposition of said blowing agent to expand so as to expand said shaped body to said predetermined configuration and size, whereby the thus-expanded cellular body will not press against the walls of said pressure vessel due to the larger interior dimensions thereof, and said gelatinized shaped body will be transformed into a closed cell cellular body of said predetermined configuration.

5. A method of producing a closed cell cellular body of predetermined configuration and size, comprising the steps of shaping a mass of plastigel consisting essentially of a mixture of a substance selected from the group consisting of polyvinylchloride and mixed polymerizates of vinylchloride with vinylacetate and vinylidenechloride and a softener therefor capable of maintaining the plastigel in a cold deformable condition, and containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having interior dimensions exceeding those of said cellular body of predetermined configuration on said reduced scale; subjecting said shaped body in said pressure vessel to superatmospheric gaseous pressure and to an elevated temperature sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; cooling said gelatinized shaped body to a lower elevated temperature being below gelatinization temperature of said shaped body but sufficiently high to maintain said shaped body in plastic condition, while maintaining superatmospheric pressure; thereafter reducing said superatmospheric pressure to lesser but still superatmospheric pressure to allow in the pressure vessel partial expansion of the gas formed upon decomposition of said blowing agent thereby transforming said gelatinized shaped body into a closed cell cellular body while simultaneously increasing the dimensions of said body to less than said predetermined configuration and size and less than the interior dimensions of said pressure vessel; removing the partial expanded body from the pressure vessel, and permitting further expansion of said gas at atmospheric pressure so as to increase the dimensions of said cellular body to said predetermined configuration and size.

6. A method of producing a cellular body of predetermined configuration and size, comprising the steps of shaping a mass of plastigel containing a latent blowing agent substantially evenly distributed therein, so as to form thereof a shaped body having a configuration corresponding to said predetermined configuration but on a reduced scale, said latent blowing agent being present in such amount as to be adapted to cause upon activation expansion at atmospheric pressure of said shaped body to said closed cell cellular body of predetermined configuration and size; placing the thus-formed shaped body into a pressure vessel having interior dimensions larger than those of said cellular body of predetermined configuration and size; subjecting said shaped body in said pressure vessel to superatmospheric gaseous pressure and to an elevated temperature sufficiently high to decompose said blowing agent and to gelatinize said plastigel while due to said superatmospheric pressure expansion of said shaped body is substantially prevented and the gas formed by decomposition of said blowing agent will be substantially distributed throughout the thus-gelatinized shaped body; reducing said superatmospheric pressure to a lesser superatmospheric pressure so as to allow partial expansion of the gas formed upon decomposition of said blowing agent, thereby transforming said gelatinized shaped body into a cellular body having dimensions greater than that of said shaped body and smaller than said predetermined configuration and size; cooling the thus partially expanded gelatinized shaped body below the gelatinization temperature thereof while maintaining said lesser superatmospheric pressure; and thereafter reducing said lesser superatmospheric pressure substantially to atmospheric pressure causing substantially complete expansion of the gas formed upon decomposition of said blowing agent, thereby transforming said gelatinized shaped body in said pressure vessel into a cellular body while simultaneously increasing the dimensions of said body to said predetermined configuration and size without interference by the walls of said pressure vessel due to the larger size of the interior dimensions thereof.

7. A method of producing a cellular body of predetermined configuration and size, comprising the steps of shaping a mass of plastigel containing a blowing agent substantially evenly distributed therein, so as to form thereof a shaped body having a configuration corresponding to said predetermined configuration but on a reduced scale; gelatinizing said plastigel, simultaneously decomposing said blowing agent therein, while maintaining it at the gelatinizing temperature and under a gaseous superatmospheric pressure sufficiently high to prevent expansion of said shaped body; cooling said gelatinized shaped body to a temperature below the gelatinization temperature thereof but sufficiently high to maintain said gelatinized shaped body in plastic condition while maintaining said superatmospheric pressure; and thereafter reducing said superatmospheric pressure so as to allow the gas formed upon decomposition of said blowing agent to expand, thereby transforming said gelatinized shaped body while in plastic condition into a cellular body simultaneously increasing the dimensions of said body to said predetermined configuration and size.

References Cited by the Examiner

UNITED STATES PATENTS

| 1,033,044 | 7/12 | Aylsworth. | |
|---|---|---|---|
| 2,283,316 | 5/42 | Cooper et al. | 18—53 |
| 2,447,056 | 8/48 | Cooper. | |
| 2,524,039 | 10/50 | Carpentier | 18—48 |
| 2,525,880 | 10/50 | Feldman | 18—48 |
| 2,525,965 | 10/50 | Smith | 18—48 |
| 2,590,156 | 3/52 | Carpentier | 18—48 |
| 2,737,503 | 3/56 | Sprague et al. | 18—48 |
| 2,751,627 | 6/56 | Lindemann | 18—48 |

FOREIGN PATENTS

| 626,151 | 7/49 | Great Britain. |
|---|---|---|
| 701,066 | 12/53 | Great Britain. |
| 859,314 | 1/61 | Great Britain. |

ALEXANDER H. BRODMERKEL, *Primary Examiner.*

MICHAEL V. BRINDISI, MORRIS LIEBMAN,
*Examiners.*